United States Patent [19]

Ely

[11] Patent Number: 4,745,940
[45] Date of Patent: May 24, 1988

[54] SAFETY VALVE WITH RESET

[76] Inventor: Laurice D. Ely, 660 W. 17th St., Unit 29, Costa Mesa, Calif. 92627

[21] Appl. No.: 35,894

[22] Filed: Apr. 8, 1987

[51] Int. Cl.4 .......................................... F16K 17/36
[52] U.S. Cl. .................................. 137/39; 137/68.1; 137/73; 137/75; 137/901
[58] Field of Search .................. 137/38, 39, 45, 68.1, 137/73, 75

[56] References Cited

U.S. PATENT DOCUMENTS

| | | |
|---|---|---|
| 1,022,119 | 4/1912 | Barton . |
| 2,054,563 | 9/1936 | Hansen . |
| 2,158,753 | 5/1939 | Hansen . |
| 2,223,097 | 11/1940 | Ehret ............................... 137/45 X |
| 2,615,461 | 10/1952 | Crow . |
| 2,713,870 | 7/1955 | Baker . |
| 2,853,089 | 9/1958 | Bair ....................................... 137/39 |
| 2,884,938 | 5/1959 | Hildebrandt . |
| 3,877,476 | 4/1975 | Mills .................................... 137/75 |
| 4,488,566 | 12/1984 | Hicks ................................. 137/75 X |
| 4,535,796 | 8/1985 | Terrones ............................... 137/45 |
| 4,549,717 | 10/1985 | Dewaegkeneire . |

FOREIGN PATENT DOCUMENTS 1601320 11/1970 Fed. Rep. of Germany ........ 137/75

Primary Examiner—Robert G. Nilson
Attorney, Agent, or Firm—Fleit, Jacobson, Cohn & Price

[57] ABSTRACT

A flow controlling valve is provided for disposition within a pipeline or the like which may be subject to excessive vibrations and/or temperature and the valve includes a valve member shiftable between open and closed positions, yieldingly biased to the closed position and retained in an open position through the utilization of frangeable retaining means having a first portion connected to the valve member and a second portion anchored relative to the body of the valve through the utilization of a fusible link.

9 Claims, 2 Drawing Sheets

SAFETY VALVE WITH RESET

BACKGROUND OF THE INVENTION

1. FIELD OF THE INVENTION

This invention relates to a valve designed to be serially connected within a pipeline or the like for conveying flammable liquids and/or gasses or conveying toxic liquids and/or gasses, wherein the pipeline may be subject to fracturing due to excessive vibration or relative shifting of longitudinally spaced portions of the line (as might occur during an earthquake) or wherein the line may be exposed to extreme heat. The safety valve is operative to block the flow of liquids or gasses therethrough responsive to experiencing vibrations above a predetermined magnitude or temperatures above a predetermined temperature. However, the valve includes a reset mechanism whereby, in the event the valve is closed as a result of experiencing earthquake vibrations and the pipeline is subsequently determined to be fully operational, the valve may be manually opened.

2. DESCRIPTION OF RELATED ART

Various different forms of safety valves including some of the general structural and operational features of the instant invention heretofore have been known. Examples of safety valves presently known and believed to be even somewhat pertinent to the instant invention are disclosed in U.S. Pat. Nos. 1,022,119, 2,054,563, 2,158,753, 2,615,461, 2,713,870, 2,884,938, 4,488,566 and 4,549,717. However, these previously known forms of safety valves do not include the overall combination of structural and operational features of the instant invention.

SUMMARY OF THE INVENTION

The safety valve of the instant invention includes a hollow valve body including inlet and outlet ports and defining a fluid flow passageway therethrough communicating the ports. The valve body is adapted to be serially connected in a pipeline with adjacent sections of the line opening into the inlet and outlet ports. The passageway defines a valve seat intermediate the ports and a valve member is mounted in the body for shifting relative thereto into and out of closed position in seated engagement with the seat. Biasing means mounted within the body is operatively associated with the valve member and yieldingly biases the latter toward the closed position. However, frangeable retaining means is operatively connected between the valve member and body retaining the valve member in an open position out of seated engagement with the seat against the biasing action of the bias means tending to shift the valve member toward its closed position.

The frangeable retaining means includes a first portion thereof anchored relative to the valve member and a second portion remote from the first portion anchored relative to the valve body through the utilization of a fusable link. Accordingly, the retaining means is operative to release the valve member for movement toward its closed position not only responsive to the valve being subjected to vibration above a predetermined magnitude, but also responsive to the valve being subjected to heat above a predetermined temperature.

The safety valve, however, is provided with structure whereby the valve member, after having been released by the retaining means for movement toward a closed position, may be displaced from the closed position toward an open position in the event the associated pipeline, subsequent to release of the retaining means, has been found to be undamaged.

The main object of this invention is to provide a safety valve for use in conjunction with pipelines which convey flammable liquids or gasses or liquids and gasses which may be considered toxic and wherein the pipelines may be subject to excessive vibrations or high temperatures which could cause failure of the pipelines. The safety valve is constructed to automatically close responsive to being subjected to vibrations above a predetermined magnitude or temperatures above a predetermined maximum temperature to thus close the associated pipeline against the flow of fluent materials therethrough.

Furthermore, the safety valve is, however, equipped with an exteriorally operably reset mechanism whereby, in the event the pipeline experiences vibrations or high temperatures sufficient to close the valve, the valve may be manually reopened in the event inspection of the pipeline, subsequent to the valve being closed, results in a determination that the pipeline is in fact fully operational as designed.

The main object of this invention is to provide a safety valve for a pipeline or the like utilized to convey fluids and which valve will be operational to automatically close reponsive to the pipeline or valve being subject to excessive vibrations.

Another object of this invention in accordance with the immediately preceding object is to provide a safety valve which will also be operative to automatically close responsive to the valve being exposed to extreme heat above a predetermined maximum temperature.

Yet another object of this invention is to provide a safety valve in accordance with the preceding objects and which may be reset in the event the pipeline is determined to be fully operational after the valve has automatically closed as a result of experiencing excessive vibrations or being exposed to extreme heat.

A further object of this invention is to provide a safety valve which is wholly mechanical in its automatic closing operation.

A further object of this invention is to provide a safety valve of the resettable type and which includes structure for mechanical reset, only, of the valve.

A final object of this invention to be specifically enumerated herein is to provide a safety valve with reset in accordance with the preceding objects and which will conform to conventional forms of manufacture, be of simple construction and automatic in operation so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
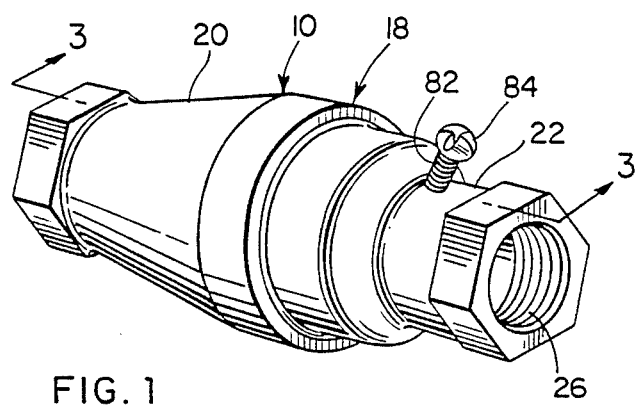
FIG. 1 is a perspective view of the valve as seen from the downstream end thereof.
Figure 2:
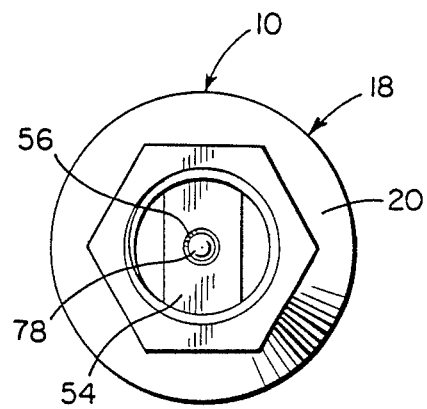
FIG. 2 is an end elevational view of the valve as seen from the upstream end thereof.
Figure 3:
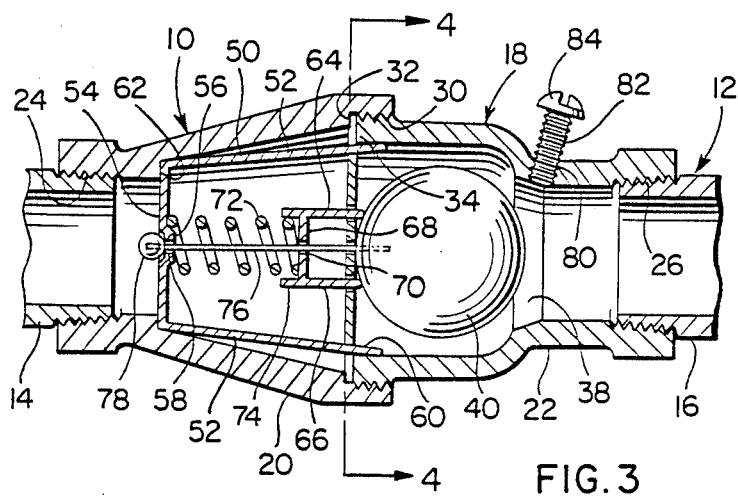
FIG. 3 is an enlarged vertical sectional view taken substantially upon the plane indicated by the section line 3—3 of FIG. 1 and with the valve member of the valve retained in an open position.

Referring now more specifically to the drawings the numeral 10 generally designates the safety valve of the instant invention. The valve 10 is illustrated in FIG. 3 as serially connected within a pipeline referred to in general by the reference numeral 12 between upstream and downstream sections 14 and 16 of the pipeline 12.

The valve includes a valve body referred to in general by the reference numeral 18 and incorporating first and second tubular valve body sections 20 and 22. The inlet end of the section 20 is internally threaded as at 24 for threaded engagement with the upstream section 14 of the pipeline 12 and the outlet end of the valve body section 22 is internally threaded as at 26 for threaded engagement with the downstream section 16 of the pipeline 12. Further, the outlet end of the valve body section 20 is enlarged and internally threaded as at 28 and the inlet end of the valve body section 22 is enlarged and externally threaded as at 30 and threadedly engaged with the outlet end of the section 20, opposing circumferentially and radially extending shoulders 32 and 34 being defined on the outlet and inlet ends of the valve body sections 20 and 22, respectively, between which the outer periphery of a rigid diaphragm 36 is clamped.

An intermediate length portion of the valve body section 20 includes an upstream facing frustoconical valve seat 38 and a spherical valve member 40 is disposed between the diaphragm 36 and the seat 38. Also, the diaphragm 36 includes a plurality of large fluid flow ports 42 formed therethrough, a pair of diametrically opposite radially outwardly opening notches 44 formed therein, a small central guide aperture 46 formed therein and four additional small guide apertures 48 formed therein spaced outward of and about the center guide aperture 46.

Figure 6:
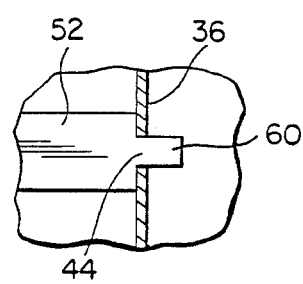
FIG. 6 is a fragmentary horizontal sectional view taken substantially upon the plane indicated by the section line 6—6 of FIG. 5.

A U-shaped anchor structure 50 is disposed substantially entirely within the valve body section 20, opens toward the valve body section 22 and includes a pair of slightly divergent legs 52 interconnected by a bight portion 54 having a central depression 56 formed therein including a center guide aperture 58. In addition, the free ends of the legs 52 include transversely diminished positioning tabs 60, see FIG. 6, received through the notches 44, whereby the anchor structure 50 is held in predetermined position within the valve body section 20, the opposite ends of the bight portion 54 being seated against an internal radially and circumferentially extending shoulder 62 formed in and facing in a downstream direction within the valve body section 20.

A multi-legged thrust member 64 is provided and includes four legs 66 slidingly received through the additional guide apertures 48, the thrust member 64 including a transverse web 68 having a central aperture 70 formed therein. The web 68 is disposed on the upstream side of the diaphragm 36 and the legs 66 project through the apertures 48 and engage the valve member 40.

A coiled compression spring 72 is disposed between the web 68 and the bight portion 54. The depression 56 projects into and thus locates the adjacent end of the compression spring 72 and the web 68 includes a peripheral wall 74 which locates the end of the spring 72 abutting the web 68, the apertures 58 and 70 being aligned with each other and the aperture 46 along a line coinciding with the longitudinal center axis of the spring 72.

The spring 72 serves to yieldingly bias the thrust member, and thus the valve member 40, to the right as viewed in FIG. 3 until the valve member 40 seats against the seat 38. However, an elongated retaining rod 76 is provided and has one end anchored relative to the valve member 40 and the other end projecting through the aperture 58 and provided with a fusible abuttment or link 78, whereby the valve member 40 is retained in the open position thereof illustrated in FIG. 3. The rod 76 is constructed of a frangible material and, as previously set forth, the abuttment 78 comprises a fusible link.

Figure 8:
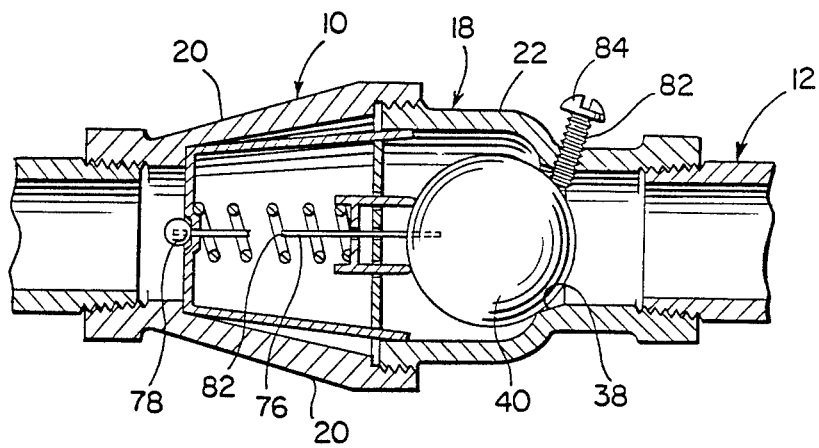
FIG. 8 is a vertical sectional view similar to FIG. 5, but illustrating the valve member in a partially reset position.

With attention now invited again to FIG. 3, it may be seen that the valve body section 22 includes an angled threaded bore 80 in which a thrust screw 82 is sealingly threaded. The screw 82 includes a slotted head 84 thereon of the type which enables the screw 82 to be turned only in the direction which threads the screw 82 inwardly of the bore 80. The inner end of the screw 80 may engage the valve member 40 and displace the valve member 40, at least partially, from full-seated engagement with the seat 38, see FIG. 8.

Figure 5:
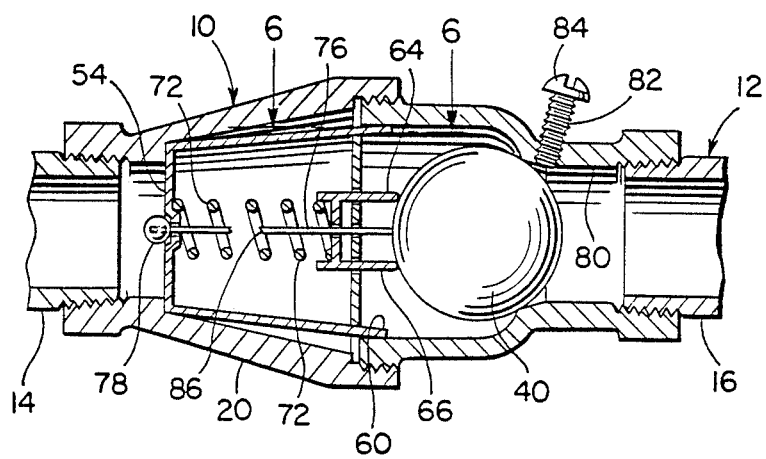
FIG. 5 is a longitudinal vertical sectional view similar to FIG. 3 but illustrating the valve member in a closed position as a result of breakage of the frangeable valve member retaining means.

In operation, when the valve 10 is installed, the internal components thereof are as illustrated in FIG. 3 of the drawings and a fluid flow may pass through the valve body 18 in a downstream direction (to the right as viewed in FIG. 3). However, should the pipeline and valve body 18 be subject to vibrations such as that which may be experienced as a result of a nearby earthquake registering 6.0 on the Reichter scale, the frangeable rod 76 is designed to break as at 86, see FIG. 5, and the compression spring 72 will exert a thrust on the thrust member 64 and valve member 40 in order to shift the valve member to the closed position thereof illustrated in FIG. 5. In this manner, the valve 10 will automatically close the pipeline 12 to the flow of fluid therethrough downstream from the valve 10. This is to ensure that flammable or toxic fluids supplied to the pipeline will not escape into the environment in the event the pipeline 12 is broken as a result of an earthquake. Of course, the pipeline 12 is constructed of such strength to resist a nearby earthquake which registers greater than 6.0 on the Reichter scale. If an earthquake occurs and the frangeable rod 76 breaks as at 86, but the pipeling 12 is not damaged, the screw 82 may be turned inward of the bore 80 to partially unseat the valve member 40 from the seat 38 and thereby restore the flow of fluid through the pipeline 12.

Figure 4:
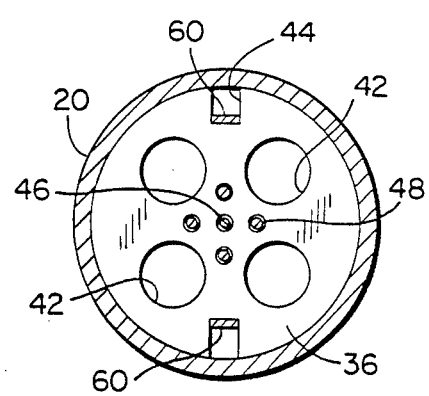
FIG. 4 is a transverse vertical sectional view taken substantially upon the plane indicated by the section line 4—4 of FIG. 3.
Figure 7:
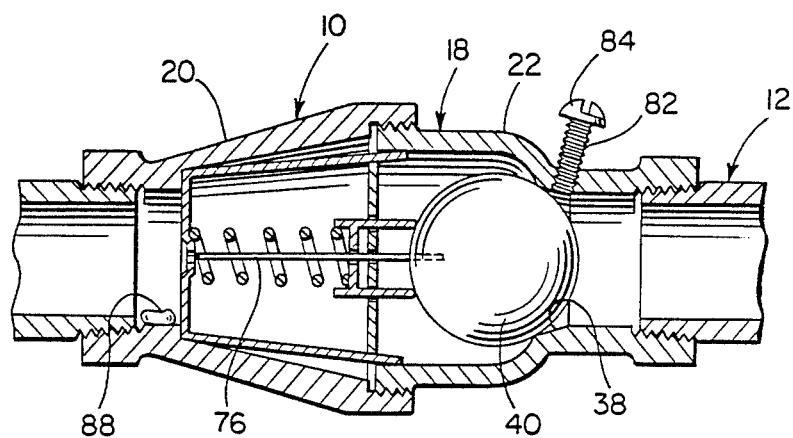
FIG. 7 is a longitudinal vertical sectional view similar to FIG. 3, but illustrating the valve member in a closed position as a result of melting of the fuseable link portion of the retaining means.

If, on the other hand, the pipeline 12 adjacent the valve 10 is subject to extreme temperatures, the fusible link or abutment 78 will melt and fall from the end of the rod 76 remote from the valve member 40 as illustrated at 88 in FIG. 7 and the frangeable rod 76 will be released from its anchor to the anchor structure 50, whereby the spring 72 will be effective to shift the valve member 40 to the closed position thereof illustrated in FIG. 4. Here again, if the valve 10 has been closed as a result of extreme heat and the pipeline 12 subsequently has been determined to be fully operational, the screw 82 may be turned inwardly to at least partially unseat the valve member 40 from the seat 38 and restore the flow of fluid through the pipeline 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted, falling within the scope of the invention.

What is claimed as new is as follows:

1. A safety valve with reset for use in earthquake areas and other environments in which pipelines and the like for conveying flammable liquids and/or gasses or conveying toxic fluids and/or gasses may be subject to fracturing due to excessive vibration or relative shifting of longitudinally spaced portions of the pipeline or exposure to extreme heat, said safety valve incorporating a hollow valve body including inlet and outlet ports, the interior of said body defining an internal passageway therein communicating said ports, said valve body being adapted to be serially connected in a pipeline with adjacent sections of said line opening into said inlet and outlet ports, said passageway defining a valve seat intermediate said ports, a valve member mounted in said body for shifting relative thereto into and out of closed position in seated engagement with said seat, bias means operatively associated with said valve member yieldingly biasing said valve member toward said closed position, and frangeable retaining means retaining said valve member in an open position out of seated engagement with said seat against the biasing action of said bias means, said frangeable retaining means being frangeable upon said valve body experiencing vibrations above a predetermined magnitude, whereby said valve member will be released for movement under the biasing action of said bias means toward a closed position seated against said seat, said bias means including spring means mounted from said body and yieldingly biasing said valve member toward said closed partition, said retaining means including a rod of frangeable material under longitudinal tension by said spring means and having one end anchored relative to said valve member and a second end anchored relative to said body, said second end of said frangeable rod being anchored relative to said body through the utilization of fusible link means.

2. The safety valve of claim 1 wherein said valve body includes means operative from the exterior of said body, sealingly shiftably supported from said body for movement relative thereto between active and inactive positions and operable, when shifted from said inactive position to said active position, to shift said valve member from the closed position to the open position thereof.

3. A safety valve with reset in environments in which pipelines may be subject to excessive heat, said safety valve incorporating a hollow valve body including inlet and outlet ports, the interior of said body defining an internal passageway therein communicating said port, said valve body being adapted to be serially connected in a pipeline with adjacent sections of said pipeline opening into said inlet and outlet ports, said passageway defining a valve seat intermediate said ports, a valve member mounted in said body for shifting relative thereto into and out of closed position in seated engagement with said seat, bias means operatively associated with said valve member yieldingly biasing said valve member toward said closed position and retaining means retaining said valve member in an open position out of seated engagement with said seat against the biasing action of said bias means, said retaining means including a first portion thereof anchored relative to said valve member and a second portion thereof anchored relative to said valve body through the utilization of a heat fusible link, said retaining means including a rod of frangeable material under longitudinal tension by said spring means and having one end portion anchored relative to said valve member comprising said first portion and a second end comprising said second portion of said retaining means.

4. The safety valve of claim 3 wherein said valve body includes means operative from the exterior of said body, sealingly shiftably supported from said body for movement relative thereto between active and inactive positions and operable, when shifted from said inactive position to said active position, to shift said valve member from the closed position to the open position thereof.

5. The safety valve of claim 4 wherein said bias means includes spring means mounted from said body and yieldingly biasing said valve member toward said closed position.

6. A safety valve with reset for use in earthquake areas and other environments in which pipelines and the like for conveying flammable liquids and/or gasses or conveying toxic fluids and/or gasses may be subject to fracturing due to excessive vibration or relative shifting of longitudinally spaced portions of the pipeline or exposure to extreme heat, said safety valve incorporating a hollow valve body including inlet and outlet ports, the interior of said body defining an internal passageway therein communicating said ports, said valve body being adapted to be serially connected in a pipeline with adjacent sections of said pipeline opening into said inlet and outlet ports, said passageway defining a valve seat intermediate said ports, a valve member mounted in said body for shifting relative thereto into and out of closed position in seated engagement with said seat, bias means operatively associated with said valve member yieldingly biasing said valve member toward said closed position, and frangeable retaining means retaining said valve member in an open position out of seated engagement with said seat against the biasing action of said bias means, said frangeable retaining means being frangeable upon said valve body experiencing vibrations above a predetermined magnitude, whereby said valve member will be released for movement under the biasing action of said bias means toward a closed position seated against said seat, said bias means including spring means mounted from said body and yieldingly biasing said valve member toward said closed position, said retaining means including a rod of frangeable material under longitudinal tension by said spring means and having one end anchored relative to said valve member and a second end anchored relative to said body, said valve seat opening toward said inlet port, said valve member being disposed in an upstream position from said seat toward said inlet port when in the open position, said valve body including a partition extending transversely of said passageway disposed upstream from said valve member and having fluid flow openings formed therethrough spaced outward of the central area of said partition, said central area of said partition including an aperture formed therethrough, said retaining means including a rod of frangeable material having a first end portion anchored relative to said valve member and a second end portion slidably received through said aperture and anchored relative to said body said second end of said frangeable rod being anchored to said body through the utilization of fusible link means.

7. The safety valve of claim 6 wherein said valve body includes a pair of opposite end sections removably joined together, said partition being mounted between opposing surfaces of said opposite end sections.

8. A safety valve with reset in environments in which pipelines may be subject to excessive heat, said safety valve incorporating a hollow valve body including inlet and outlet ports, the interior of said body defining an internal passageway therein communicating said port, said valve body being adapted to be serially connected in a pipeline with adjacent sections of said pipeline opening into said inlet and outlet ports, said passageway defining a valve seat intermediate said ports, a valve member mounted in said body for shifting relative thereto into and out of closed position in seated engagement with said seat, bias means operatively associated with said valve member yieldingly biasing said valve member toward said closed position and retaining means retaining said valve member in an open position out of seated engagement with said seat against the biasing action of said bias means, said retaining means including a first portion thereof anchored relative to said valve member and a second portion thereof anchored relative to said valve body through the utilization of a heat fusible link, said valve seat opening toward said inlet port, said valve member being disposed in an upstream position from said valve seat toward said inlet port when in the open position, said valve body including a partition extending transversely of said passageway disposed upstream from said valve member and having fluid flow openings formed therethrough spaced outward of the central area of said partition, said central area of said partition including an aperture formed therethrough, said retaining means including a rod of frangeable material, said first portion comprising a first end portion of said rod anchored relative to said valve member and said second portion comprising a second end portion of said rod slidably received through said aperture and anchored relative to said body.

9. The safety valve of claim 8 wherein said second rod end portion is secured to said body through the use of a heat fusible link.

* * * * *